(12) United States Patent
Tran et al.

(10) Patent No.: US 7,495,426 B2
(45) Date of Patent: Feb. 24, 2009

(54) TEMPERATURE SETPOINT CIRCUIT WITH HYSTERESIS

(75) Inventors: Chau C. Tran, Malden, MA (US); A. Paul Brokaw, Tucson, AZ (US)

(73) Assignee: Analog Devices, Inc., Norwood, MA (US)

( * ) Notice: Subject to any disclaimer, the term of this patent is extended or adjusted under 35 U.S.C. 154(b) by 450 days.

(21) Appl. No.: 11/370,155

(22) Filed: Mar. 6, 2006

(65) Prior Publication Data
US 2007/0205295 A1 Sep. 6, 2007

(51) Int. Cl.
*G05F 3/16* (2006.01)
(52) U.S. Cl. .................... 323/315; 323/907
(58) Field of Classification Search ............. 323/312, 323/315, 317, 907; 327/530, 534, 535, 537, 327/538
See application file for complete search history.

(56) References Cited

U.S. PATENT DOCUMENTS

| | | | | |
|---|---|---|---|---|
| 5,394,078 A | * | 2/1995 | Brokaw | 323/313 |
| 5,672,961 A | * | 9/1997 | Entrikin et al. | 323/315 |
| 5,821,741 A | | 10/1998 | Brokaw | 323/311 |
| 5,828,329 A | * | 10/1998 | Burns | 341/155 |
| 5,982,201 A | * | 11/1999 | Brokaw et al. | 327/53 |

OTHER PUBLICATIONS

Analog Devices, Inc., "Low Voltage, Resistor Programmable Thermostatic Switch", AD22105, 1996, pp. 1-8.

* cited by examiner

*Primary Examiner*—Matthew V Nguyen
(74) *Attorney, Agent, or Firm*—Koppel, Patrick, Heybl & Dawson

(57) ABSTRACT

A temperature setpoint circuit comprises bipolar transistors Q1 and Q2 which receive currents I1 and I2 at their respective collectors and are operated at unequal current densities, with a resistance R1 connected between their bases such that the difference in their base-emitter voltages ($\Delta V_{be}$) appears across R1. An additional PTAT current I3 is maintained in a constant ratio to I1 and I2 and provided to the collector of Q2 while Q2 is off, and is not provided while Q2 is on. The circuit is arranged such that Q2 is turned on and conducts a current equal to Ia when:
$\Delta V_{be}=(kT/q)\ln(NI1/Ia)$, where Ia=I2+I3, the temperature T at which $\Delta V_{be}=(kT/q)\ln(NI1/Ia)$ being the circuit's setpoint temperature, such that the switching of current I3 provides hysteresis for the setpoint temperature which is approximately constant over temperature.

17 Claims, 3 Drawing Sheets

TEMPERATURE SETPOINT CIRCUIT WITH HYSTERESIS

BACKGROUND OF THE INVENTION

1. Field of the Invention

This invention relates to temperature setpoint circuits, and particularly to temperature setpoint circuits with hysteresis.

2. Description of the Related Art

Many circuits have been devised to sense ambient temperature and to toggle an output signal when a predetermined setpoint temperature is reached. Such circuits often employ resistors or bipolar transistors having characteristics which vary in a predictable way with temperature. However, such circuits suffer from a number of shortcomings. For example, the temperature setpoint may vary due to a variety of manufacturing variables, such as sheet resistance variations, current density errors, and variations in the transistors' base-to-emitter voltages from lot to lot.

One bipolar transistor-based temperature setpoint circuit is described in U.S. Pat. No. 5,821,741 to Brokaw, an embodiment of which is shown in FIG. 1. A transistor Q1 and a current source 10 providing a current I1 are sized such that Q1 operates at a predetermined current density, and a transistor Q2 and a current source 12 providing a current I2 are sized such that Q2 operates at a different, smaller current density. The circuit is arranged such that I1 and I2 are proportional-to-absolute-temperature (PTAT) currents. A transistor Q3 is arranged to force Q1 to conduct I1. A resistance R1 is connected between the bases of Q1 and Q2, such that the difference in their base-emitter voltages ($\Delta V_{be}$) appears across R1. A resistance R2, and a setpoint resistance $R_{set}$, which may be external to the IC, form a voltage divider with R1. $R_{set}$ is selected to produce a desired temperature setpoint.

The circuit is arranged such that Q2 is turned on and conducts a current equal to I2 when:
$\Delta V_{be} = (kT/q)\ln(J1/J2)$, where J1 and J2 are the current densities in Q1 and Q2, respectively.
The temperature T at which $\Delta V_{be} = (kT/q)\ln(J1/J2)$ is the said circuit's setpoint temperature $T_{sp}$.

A transistor Q4 is connected such that it is turned on when Q2 is turned off, and vice versa; the collector of Q4 provides the setpoint circuit's output voltage $V_{out}$. When the temperature is less than $T_{sp}$, Q2 is off, Q4 is on and $V_{out}$ is low, and when the temperature is greater than $T_{sp}$, Q2 is turned on, Q4 is turned off, and $V_{out}$ goes high.

In some temperature setpoint applications, it is desirable that the circuit exhibit some hysteresis around the setpoint temperature, to prevent multiple transitions of $V_{out}$ when the temperature crosses the setpoint. In U.S. Pat. No. 5,821,741, this is accomplished by adding small value resistors in series with the emitters of Q1 and Q2. Since I1 and I2 are PTAT currents, the voltages developed across the series resistors at the set point are also PTAT. These voltages serve to offset the base-emitter voltages of Q1 and Q2, thereby causing the circuit's trip point to be shifted. When Q2 is off, a controlled PTAT current is switched into the resistor in series with Q2's emitter, which further shifts the trip point. However, when Q2 is on, the controlled PTAT current is disabled and the trip point shifts back, thereby creating some hysteresis around $T_{sp}$.

As a practical matter, these small value resistors connected in series with Q1 and Q2 are difficult to fabricate, and to make match the other circuit components. They are also difficult to trim, particularly since it is difficult to separate their effect from the set point value.

SUMMARY OF THE INVENTION

A temperature setpoint circuit is presented, which provides an easily defined hysteresis width which is substantially independent of temperature.

The present setpoint circuit comprises first and second bipolar transistors Q1, Q2 and first and second current sources connected to provide currents I1 and I2 to the collectors of Q1 and Q2, respectively. I1 and I2 are PTAT currents which are maintained in a constant ratio to each other. A third transistor is arranged to drive the base of Q1 such that it conducts I1. A resistance R1 is connected between the bases of Q1 and Q2 such that the difference in their base-emitter voltages ($\Delta V_{be}$) appears across R1. A third current source provides a current I3, which is provided to the collector of Q2 while Q2 is off, and is not provided to the collector of Q2 while Q2 is on. I3 is a PTAT current which is maintained in a constant ratio to I1 and I2 when provided to the collector of Q2.

The circuit is arranged such that Q2 is turned on and conducts a current equal to Ia when:

$\Delta V_{be} = (kT/q)\ln(NI1/Ia)$, where $Ia = I2 + I3$, the temperature T at which $\Delta V_{be} = (kT/q)\ln(NI1/Ia)$ being the circuit's setpoint temperature. Since Ia is made equal to I2 or I2+I3, there are two setpoint values: a first value when Q2 is off and Ia=I2+I3, and a second value when Q2 is on and Ia=I2. Thus, the switching of current I3 provides hysteresis for the setpoint temperature, and since I3 is a PTAT current, the hysteresis is approximately constant over temperature.

In a preferred embodiment, the first, second and third current sources comprise a PTAT current source which provides a fixed PTAT current, which is mirrored by respective transistors to provide PTAT currents I1 and I2. A resistance Rh is connected between the positive supply voltage and a second emitter on transistor providing I2. A diversion circuit is connected to divert the Rh current $I_{R2}$ from the second emitter when Q2 is turned on, such that $I3 \approx I_{Rh}$ when Q2 is turned off and $I3 \approx 0$ when Q2 is turned on. When so arranged, I3 is a PTAT current when Q2 is turned off, and so will be in a constant ratio with I1 and I2.

A hysteresis-disable feature is easily provided with a circuit that continuously diverts $I_{Rh}$ from the second emitter, regardless of the state of Q2. The hysteresis width is readily defined by trimming resistance Rh, and once trimmed, remains substantially constant over temperature.

Further features and advantages of the invention will be apparent to those skilled in the art from the following detailed description, taken together with the accompanying drawings.

DETAILED DESCRIPTION OF THE INVENTION

Figure 1:
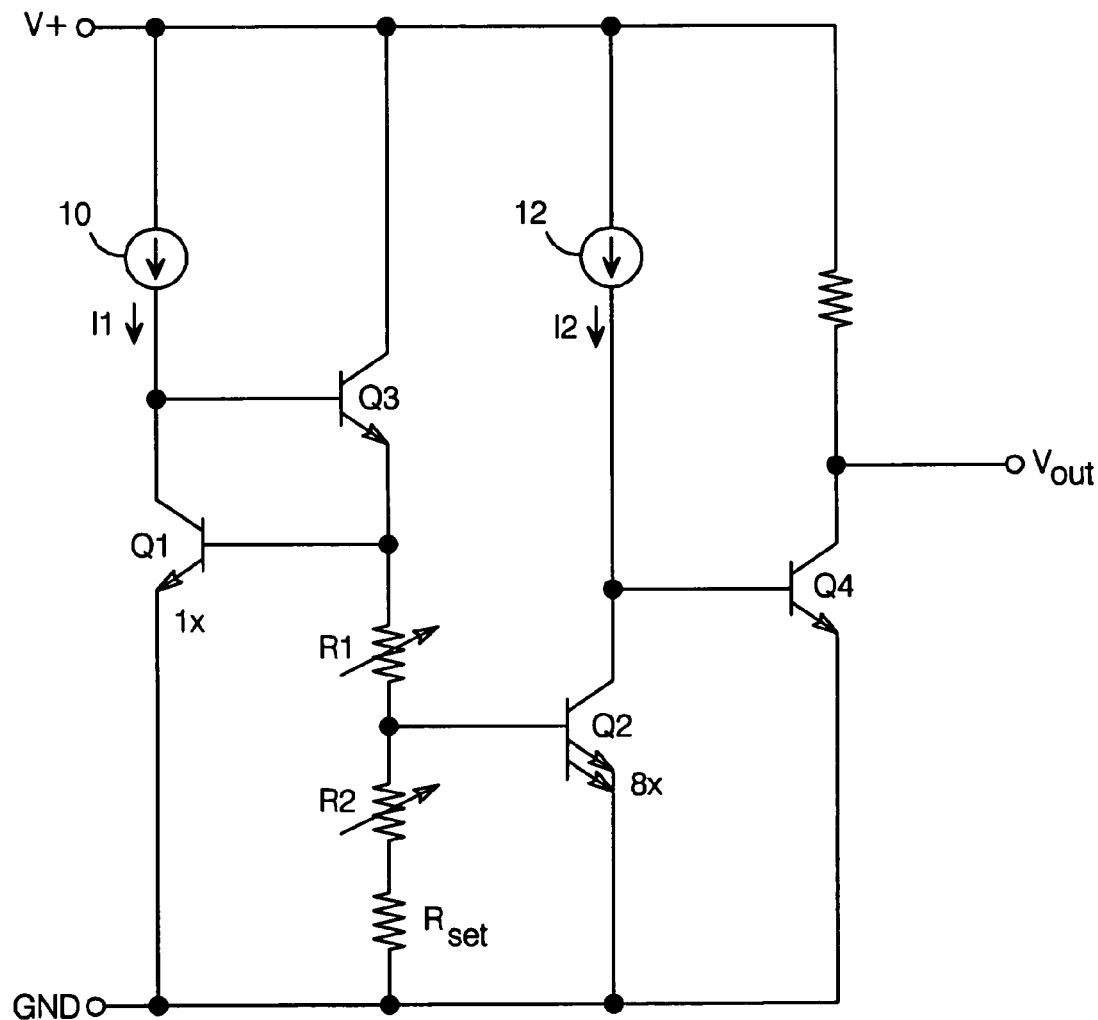
FIG. 1 is a schematic diagram of a known temperature setpoint circuit.
Figure 2:
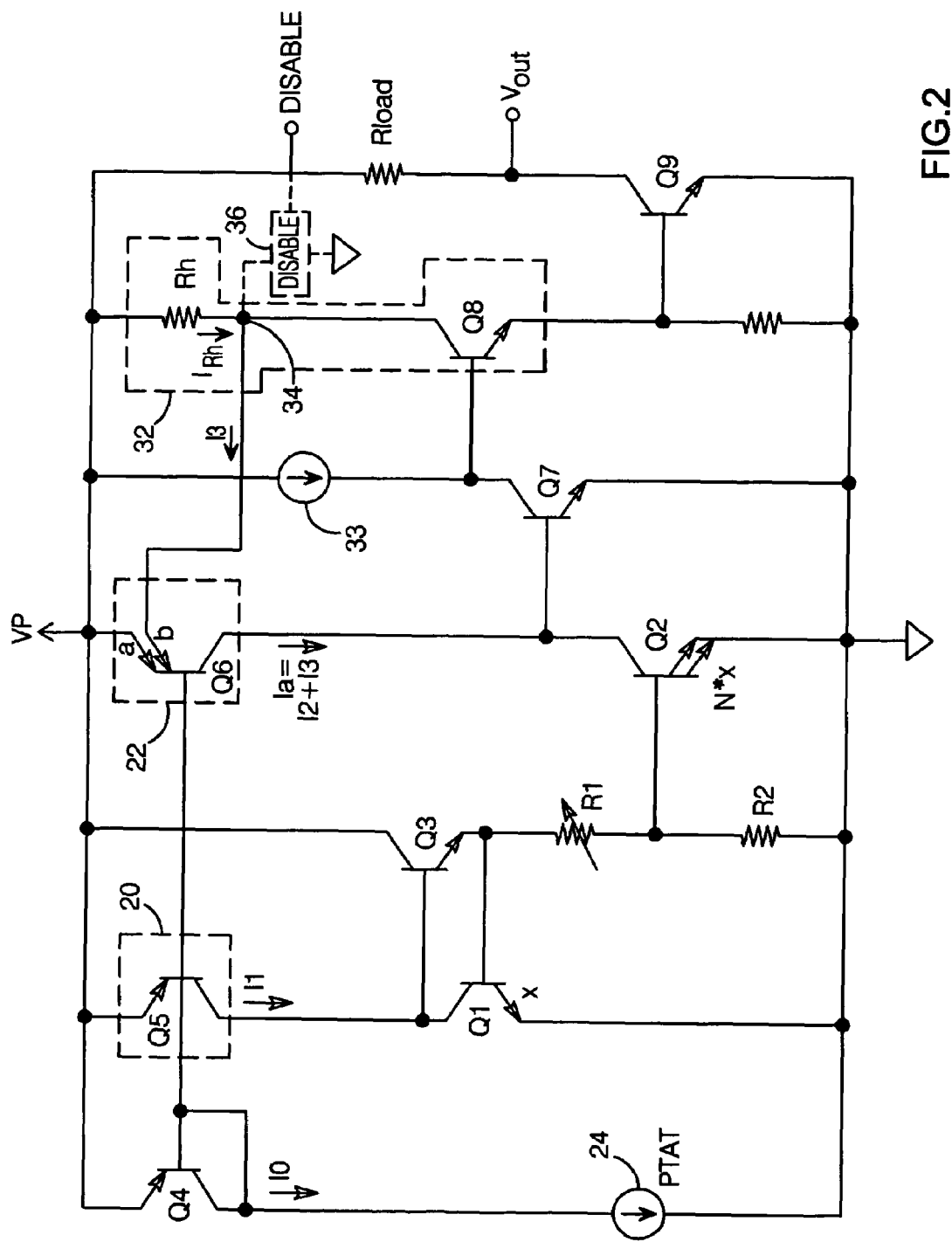
FIG. 2 is a schematic diagram of a temperature setpoint circuit in accordance with the present invention.

The basic principles of temperature setpoint circuit with hysteresis in accordance with the present invention are shown in FIG. 2. As in FIG. 1, a transistor Q1 and a current source 20 providing a current I1 are sized such that Q1 operates at a predetermined current density. A transistor Q2 and a current source 22 providing a current I2 are sized such that Q2 operates at a different, smaller current density; this can be done by making I2 smaller than I1, Q2 larger than Q1, or both. Note that, in FIG. 2, the current provided by current source 22 is labeled "Ia"; this current includes I2, as explained in detail below. A transistor Q3 is arranged to force Q1 to conduct I1. A resistance R1 is connected between the bases of Q1 and Q2, such that the difference in their base-emitter voltages ($\Delta V_{be}$) appears across R1.

The present circuit is arranged such that I1 and I2 are PTAT currents which are maintained in a constant ratio to each other. There are a number of known ways in which this can be accomplished, one of which is illustrated in FIG. 2. A current source 24 provides a PTAT output current I0 by known means. I0 is conducted by a diode-connected transistor Q4, and current sources 20 and 22 are implemented with respective transistors Q5 and Q6 which form current mirrors with Q4 such that I0 (or a multiple or fraction thereof) is mirrored to Q1 and Q2 as PTAT currents I1 and I2, respectively.

A third current source 32 is connected to provide a current I3. As discussed in more detail below, the setpoint temperature circuit is arranged such that I3 is provided to the collector of Q2 while Q2 is off, and is not provided to the collector of Q2 while Q2 is on. The present circuit is also arranged such that I3 is a PTAT current which is maintained in a constant ratio to I1 and I2 when provided to the collector of Q2. In FIG. 2, the current provided to the collector of Q2 is identified as Ia, which is given by Ia=I2+I3.

The present circuit is arranged such that Q2 is turned on and conducts a current equal to Ia when:
$\Delta V_{be}$=(kT/q)ln(J1/J2), where J1 and J2 are the current densities in Q1 and Q2, respectively. When Q1 has an emitter area of x and Q2's emitter area is N*x, this can be written as:

$$\Delta V_{be}=(kT/q)ln(NI1/Ia).$$

The temperature T at which $\Delta V_{be}$=(kT/q)ln(NI1/Ia) is the circuit's setpoint temperature $T_{sp}$. Since Ia is made equal to either I2 or I2+I3, there are two $T_{sp}$ values for this arrangement: a first setpoint temperature $T_{sp1}$ (the "trip point") which applies when Q2 is off and Ia=I2+I3, and a second setpoint temperature $T_{sp2}$ (the "untrip point") which applies when Q2 is on and Ia=I2. The difference between $T_{sp1}$ and $T_{sp2}$ is the circuit's hysteresis, with $T_{sp1}-T_{sp2}$ being the hysteresis width.

Since I3 is a PTAT current which is provided to the collector of Q2 while Q2 is off and is not provided when Q2 is on, the resulting hysteresis is approximately constant over temperature. A resistance R2 forms a voltage divider with R1, and is selected to produce a desired temperature trip point.

A transistor Q7 is preferably used to detect the state of Q2; Q7 is biased with a current source 33 and driven by Q2's collector voltage such that it is turned on when Q2 is turned off, and turned off when Q2 is turned on. Thus, when the temperature is increasing but is less than $T_{sp1}$, Q2 is off and Q7 is on, and when an increasing temperature exceeds $T_{sp1}$, Q2 is turned on and Q7 is turned off. Similarly, when the temperature is decreasing but is greater than $T_{sp2}$, Q2 is on and Q7 is off, and when a decreasing temperature falls below $T_{sp2}$, Q2 is turned off and Q7 is turned on.

Third current source 32 is preferably implemented with a resistance Rh coupled between the circuit's positive supply voltage VP and a node 34; the resistance conducts a current $I_{Rh}$. As shown in FIG. 2, transistor Q6 is preferably a multi-emitter transistor, with one of its emitters (labeled 'a') coupled to VP to produce I2, and another emitter (labeled 'b') connected to node 34. When not diverted, current $I_{Rh}$ is provided to emitter 'b' as current I3, such that it is summed with I2. Making I3 in this way ensures that it is a PTAT current which is maintained in a constant ratio to I1 and I2.

A diversion circuit, here implemented with a transistor Q8, is coupled between node 34 and circuit ground and driven by Q7's collector voltage. When Q8 is on, it pulls down and reverse biases emitter 'b' on transistor Q6, such that current $I_{Rh}$ is diverted from Q6 when Q8 is on. Thus, when Q2 is off, Q7 is on, Q8 is off, and I3≈$I_{Rh}$. When Q2 turns on, Q7 turns off, Q8 turns on, and I3≈0. Since I1 and I2 are PTAT, and the I3 current subtracted from Ia when the trip point is crossed is also PTAT, the hysteresis width will be stable over a wide temperature range.

A final output $V_{out}$ may be produced with a transistor Q9 connected as shown in FIG. 2. When the circuit is untripped, Q2 is off, Q7 is on, and Q8 and Q9 are off, making $V_{out}$ high. When tripped, Q2 is on, Q7 is off, and Q8 and Q9 are on, making $V_{out}$ low.

If desired, a 'disable' circuit 36 can be connected to node 34 and arranged to pull down on the node and thereby disable the hysteresis function in response to a control signal. By providing a means of disabling the hysteresis function regardless of the state of Q8, Q7 or Q2, the hysteresis width can be reduced to zero, making trip points $T_{sp1}$ and $T_{sp2}$ equal so that they can be more readily trimmed.

Note that, though multi-emitter transistor Q6 is used to sum I3 with I2 in FIG. 2, a separate transistor having its base and collector connected in common with those of Q6 and its emitter connected to node 34 would also be acceptable.

Figure 3:
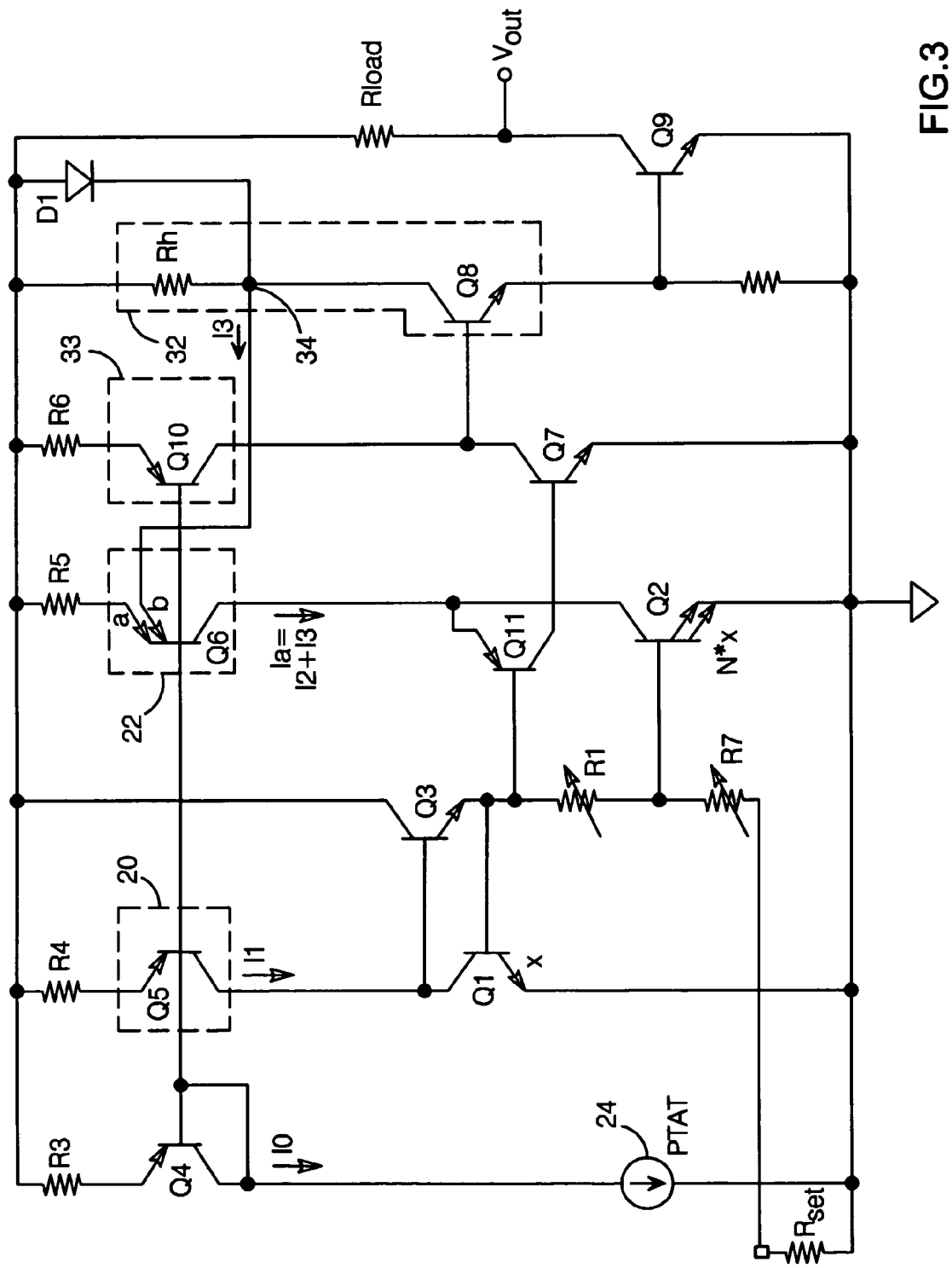
FIG. 3 is a schematic diagram of a preferred embodiment of a temperature setpoint circuit in accordance with the present invention.

A preferred embodiment of the present invention is shown in FIG. 3. Here, resistors R3, R4 and R5 are connected in series with transistors Q4, Q5 and Q6, respectively, and current source 33 is implemented with a transistor Q10 connected in series with a resistor R6 and arranged to mirror I0 to Q7. A buffer transistor Q11 is preferably connected between Q2 and Q7, and a diode D1 is connected across Rh so that the maximum voltage across Rh is limited to one junction voltage drop. Resistance R2 is here implemented with two resistors: a trimmable resistor R7 and a resistor $R_{set}$. The present setpoint temperature circuit would typically be implemented as an integrated circuit (IC). When arranged as shown in FIG. 3, resistor $R_{set}$ may be external to the IC, with its value selected to establish the circuit's setpoint temperature.

The hysteresis width h is set by the currents through R5 and Rh ($I_{R5}$ and $I_{Rh}$), as follows:
h ∝ ($I_{R5}+I_{Rh})/I_{R5}$, where I2*h is the Q2 collector current at the trip point ($T_{sp1}$) when the temperature is increasing (i.e., when Ia=I2+I3), and I2 is the Q2 collector current at the untrip point ($T_{sp2}$) when the temperature is decreasing. Thus, hysteresis width is defined by the ratio of R5 and Rh, and is substantially independent of temperature. An adequate hysteresis width is obtained with a relatively small I3 current; as such, Rh can have a large resistance, and thus can be more easily fabricated than the small value resistors required by some prior art approaches. Rh can be trimmed as necessary to obtain a desired hysteresis width, which decreases with the value of Rh.

While particular embodiments of the invention have been shown and described, numerous variations and alternate embodiments will occur to those skilled in the art. Accordingly, it is intended that the invention be limited only in terms of the appended claims.

We claim:
1. A temperature setpoint circuit, comprising:
   first and second supply voltage terminals;

a first bipolar transistor Q1 having an emitter area of x;
a second bipolar transistor Q2 having the same polarity as Q1 and an emitter area of N*x (N: an integer);
first and second current sources connected to provide currents I1 and I2 to the collectors of Q1 and Q2, respectively, said circuit arranged such that I1 and I2 are proportional-to-absolute-temperature (PTAT) currents which are maintained in a constant ratio to each other;
a third transistor Q3 arranged to drive the base of Q1 such that Q1 conducts I1;
a resistance R1 connected between the bases of Q1 and Q2 such that the difference ($\Delta V_{be}$) in the base-emitter voltages of Q1 and Q2 appears across R1; and
a third current source connected to provide a current I3, said circuit arranged such that I3 is provided to the collector of Q2 while Q2 is off and is not provided to the collector of Q2 while Q2 is on, said circuit arranged such that I3 is a PTAT current which is maintained in a constant ratio to I1 and I2 when provided to the collector of Q2;
said circuit arranged such that Q2 is turned on and conducts a current equal to Ia when:

$\Delta V_{be} = (kT/q)\ln(NI1/Ia)$, where $Ia = I2+I3$, the temperature T at which $\Delta V_{be} = (kT/q)\ln(NI1/Ia)$ being said circuit's setpoint temperature, such that said switching of current I3 provides hysteresis for said setpoint temperature which is approximately constant over temperature.

2. The temperature setpoint circuit of claim 1, further comprising a fourth transistor driven by the collector of Q2 and biased such that it is turned on when the current conducted by Q2 is less than Ia and is turned off when the current conducted by Q2 is greater than or equal to Ia.

3. The temperature setpoint circuit of claim 1, wherein said first, second and third current sources comprise:
a PTAT current source which provides a fixed PTAT current I0;
a diodeconnected transistor Q4 connected to conduct I0;
a transistor Q5 connected to form a current mirror with Q4 such that Q5 conducts PTAT current I1 to Q1;
a transistor Q6a connected to form a current mirror with Q4 such that Q6a conducts PTAT current I2 to Q2;
a resistance Rh coupled between said first supply voltage and a first node which conducts a current $I_{Rh}$;
a transistor Q6b having its base and collector connected in common with the base and collector, respectively, of Q6a, and its emitter coupled to said first node, the current conducted by Q6b to Q2 being PTAT current I3; and
a diversion circuit connected to divert $I_{Rh}$ from Q6b when Q2 is turned on, such that $I3 \approx I_{Rh}$ when Q2 is turned off and $I3 \approx 0$ when Q2 is turned on.

4. The temperature setpoint circuit of claim 3, further comprising a transistor Q7 driven by the collector of Q2 and biased such that Q7 is turned on when the current conducted by Q2 is less than Ia and is turned off when the current conducted by Q2 is greater than or equal to Ia; said diversion circuit comprising:
a transistor Q8 driven by the collector of Q7 and connected between said first node and said second supply voltage terminal, said circuit arranged such that Q8 is turned on and diverts $I_{Rh}$ from Q6b when Q2 is turned on.

5. The temperature setpoint circuit of claim 3, wherein Q6a and Q6b comprise a single multi-emitter transistor, one of said multi-emitter transistor's emitters coupled to said first supply voltage terminal and another of said multi-emitter transistor's emitters coupled to said first node.

6. The temperature setpoint circuit of claim 1, further comprising a resistance R2 connected between the base of Q2 and said second supply voltage terminal such that R1 and R2 form a voltage divider, said circuit arranged such that:
$V_{be1}*(R1/(R1+R2)) = (kT/q)\ln(NI1/Ia)$ at said setpoint temperature, where $V_{be1}$ is Q1's base-emitter voltage.

7. The temperature setpoint circuit of claim 6, wherein resistance R2 comprises first and second resistors connected between the base of Q2 and said second supply voltage terminal.

8. The temperature setpoint circuit of claim 7, wherein said setpoint temperature circuit is implemented as an integrated circuit (IC) and one of said first and second resistors comprises a setpoint resistor which is external to said IC, said IC adapted to connect to said external setpoint resistor.

9. The temperature setpoint circuit of claim 1, further comprising means for diverting I3 from Q2 regardless of the state of Q2 so as to disable said hysteresis.

10. The temperature setpoint circuit of claim 9, wherein said means comprises a disable circuit coupled between a first node and said second supply voltage terminal, said disable circuit arranged such that said first node is pulled towards the voltage at said second supply voltage terminal in response to a control signal.

11. A temperature setpoint circuit, comprising:
first and second supply voltage terminals;
a first bipolar transistor Q1 having an emitter area of x;
a second bipolar transistor Q2 having the same polarity as Q1 and an emitter area of N*x (N: an integer);
a PTAT current source which provides a PTAT current I0;
a diode-connected transistor Q4 connected to conduct I0;
a transistor Q5 connected to form a current mirror with Q4 such that Q5 conducts a PTAT current I1 to the collector of Q1;
a transistor Q6a connected to form a current mirror with Q4 such that Q6a conducts a PTAT current I2 to the collector of Q2;
a transistor arranged to drive the base of Q1 such that Q1 conducts I1;
a voltage divider comprising a first resistance R1 and a second resistance R2 connected between the base of Q1 and said second supply voltage terminal, R1 connected between the bases of Q1 and Q2 such that the difference ($\Delta V_{be}$) in the base-emitter voltages of Q1 and Q2 appears across R1;
a resistance Rh coupled between said first supply voltage and a first node which conducts a current $I_{Rh}$;
a transistor Q6b having its base and collector connected in common with the base and collector, respectively, of Q6a, and its emitter coupled to said first node, the current conducted by Q6b to Q2 being a current I3, said circuit arranged such that I3 is a PTAT current which is maintained in a constant ratio to I1 and I2 when provided to the collector of Q2; and
a diversion circuit connected to divert $I_{Rh}$ from Q6b when Q2 is turned on, such that $I3 \approx I_{Rh}$ when Q2 is turned off and $I3 \approx 0$ when Q2 is turned on;
said circuit arranged such that:
Q2 is turned on and conducts a current equal to Ia when $\Delta V_{be} = (kT/q)\ln(NI1/Ia)$, where $Ia = I2+I3$, the temperature T at which $\Delta V_{be} = (kT/q)\ln(NI1/Ia)$ being said circuit's setpoint temperature,
and such that:
$V_{be1}*(R1/(R1+R3)) = (kT/q)\ln(NI1/Ia)$ at said setpoint temperature, where $V_{be1}$ is Q1's base-emitter voltage;

such that said switching of current I3 provides hysteresis for said setpoint temperature which is approximately constant over temperature.

12. The temperature setpoint circuit of claim 11, wherein Q6a and Q6b comprise a single multi-emitter transistor, one of said multi-emitter transistor's emitters coupled to said first supply voltage terminal and another of said multi-emitter transistor's emitters coupled to said first node.

13. The temperature setpoint circuit of claim 11, wherein Q4, Q5, Q6a and Q6b are PNP transistors having their emitters coupled to said first supply voltage terminal via respective resistors.

14. The temperature setpoint circuit of claim 11, wherein resistance R2 comprises first and second resistors connected between the base of Q2 and said second supply voltage terminal.

15. The temperature setpoint circuit of claim 14, wherein resistance R1 comprises a trim resistor, and at least one of said first and second resistors comprises a trim resistor.

16. The temperature setpoint circuit of claim 15, wherein said setpoint temperature circuit is implemented as an integrated circuit (IC) and one of said first and second resistors comprises a setpoint resistor which is external to said IC, said IC adapted to connect to said external setpoint resistor.

17. The temperature setpoint circuit of claim 11, further comprising a disable circuit coupled between said first node and said second supply voltage terminal and arranged such that said first node is pulled towards the voltage at said second supply voltage terminal in response to a control signal so as to divert I3 from Q2 and thereby disable said hysteresis regardless of the state of Q2.

* * * * *